United States Patent
Rudolph

[11] Patent Number: 6,141,900
[45] Date of Patent: Nov. 7, 2000

[54] FLEXIBLE OSCILLATING FISHING LURE SYSTEM

[76] Inventor: John H. Rudolph, 1685 Arroyo Dr., Laguna Beach, Calif. 92651-1131

[21] Appl. No.: 09/157,065

[22] Filed: Sep. 18, 1998

[51] Int. Cl.[7] .......................... A01K 85/00; A01K 83/06
[52] U.S. Cl. ...................... 43/42.24; 43/42.31; 43/42.47; 43/44.8; 43/44.82
[58] Field of Search ................ 43/42.24, 42.31, 43/42.47, 42.45, 42.48, 44.8, 44.82, 43.16

[56] References Cited

U.S. PATENT DOCUMENTS

| | | | |
|---|---|---|---|
| D. 112,791 | 1/1939 | Sailors | 43/44.82 |
| 841,429 | 1/1907 | Passage | 43/42.31 |
| 986,747 | 3/1911 | Olson | 43/44.82 |
| 1,468,572 | 9/1923 | Maeda | 43/44.82 |
| 1,846,538 | 2/1932 | Albers et al. | 43/42.47 |
| 1,875,182 | 8/1932 | Southwell | 43/44.82 |
| 2,149,054 | 2/1939 | Jones | 43/42.24 |
| 2,316,048 | 4/1943 | Clarke | 43/42.24 |
| 2,334,613 | 11/1943 | Dunkelberger et al. | 43/44.82 |
| 2,461,755 | 2/1949 | Miller | 43/44.8 |
| 2,462,828 | 2/1949 | Parnell, Sr. | 43/42.24 |
| 2,503,620 | 4/1950 | Larson | 43/42.47 |
| 2,563,554 | 8/1951 | Roy | 362/280 |
| 2,621,438 | 12/1952 | Helin | 43/44.82 |
| 2,738,610 | 3/1956 | Rice | 43/42.31 |
| 2,825,174 | 3/1958 | Leinonen . | |
| 2,827,376 | 3/1958 | Breuer | 43/42.24 |
| 2,908,990 | 10/1959 | Rimbach | 43/44.82 |
| 2,927,392 | 3/1960 | Lievense et al. | 43/42.47 |
| 3,017,716 | 1/1962 | Hawks | 43/42.24 |
| 3,046,689 | 7/1962 | Woodley | 43/42.24 |
| 3,147,564 | 9/1964 | Messler | 43/42.24 |
| 3,477,164 | 11/1969 | Novak | 43/44.8 |
| 3,490,165 | 1/1970 | Thomassin | 43/42.47 |
| 3,600,838 | 8/1971 | Bablick | 43/44.8 |
| 3,760,528 | 9/1973 | Moore | 43/42.24 |
| 3,802,115 | 4/1974 | Auten et al. | 43/42.24 |
| 3,831,307 | 8/1974 | Pittman | 43/42.24 |
| 4,182,067 | 1/1980 | Pfister et al. | 43/42.47 |
| 4,203,246 | 5/1980 | Sacharnoski, Sr. | 43/42.24 |
| 4,214,396 | 7/1980 | Firmin | 43/42.24 |
| 4,251,942 | 2/1981 | Jacobus | 43/44.8 |
| 4,280,296 | 7/1981 | Volenec | 43/44.82 |
| 4,287,679 | 9/1981 | Klotz | 43/42.31 |
| 4,525,948 | 7/1985 | Huntington | 43/44.82 |
| 4,744,168 | 5/1988 | McClellen | 43/42.24 |
| 4,744,169 | 5/1988 | Nochta | 73/42.31 |
| 4,873,781 | 10/1989 | Bates | 43/42.31 |
| 4,890,412 | 1/1990 | Tsao et al. | 43/42.24 |
| 4,914,852 | 4/1990 | Hnizdor | 43/44.82 |
| 5,070,639 | 12/1991 | Pippert | 43/42.24 |
| 5,119,581 | 6/1992 | Rudolph | 43/42.22 |

FOREIGN PATENT DOCUMENTS

| | | | |
|---|---|---|---|
| 651088 | 9/1991 | Australia | 43/43.16 |
| 525891 | 9/1921 | France | 43/44.82 |
| 985975 | 7/1951 | France | 43/44.8 |
| 16438 | 8/1908 | United Kingdom | 43/44.82 |
| 273585 | 7/1927 | United Kingdom | 43/44.8 |
| WO 87/07476 | 12/1987 | WIPO | 43/42.45 |

*Primary Examiner*—Michael J. Carone
*Assistant Examiner*—Fredrick T. French, III
*Attorney, Agent, or Firm*—Gene Scott-Patent Law & Venture Group

[57] ABSTRACT

A fishing lure system, having a side to side oscillation, has a highly snag resistant flexible diving lip. A live or artificial bait is impaled on a special tandem two-hook fish hook. The lure may be controlled as to how it descends, front end first, rear end first, or level, by special adjustable hook weights, which are secured at a selected place on the hook shaft. The weights prevent lure spin and insure proper oscillation. A soft open cell, scent dispensing foam, is impaled on either hook shaft rearwardly of a fish or creature-like head, colorful jig having scent dispensing forward portion, feathers, hair, or plastic streamers for cascading over and around the rear hook. A novel coating retards destructive paint defacing problems so that a range of colors may be mixed to better replicate a live bait, tandem hook having rigid or flexible diving lip attached, rear hook positioned up or down and replaced with work shaft eye for optional hooks.

14 Claims, 5 Drawing Sheets

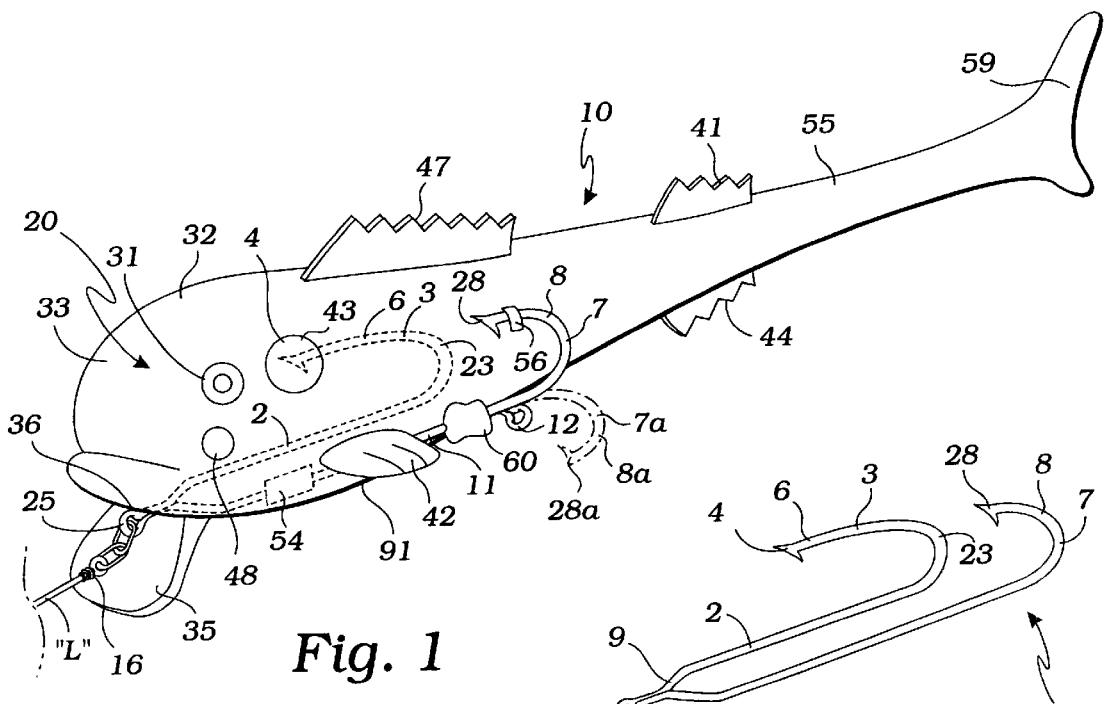
Fig. 1
Fig. 1a
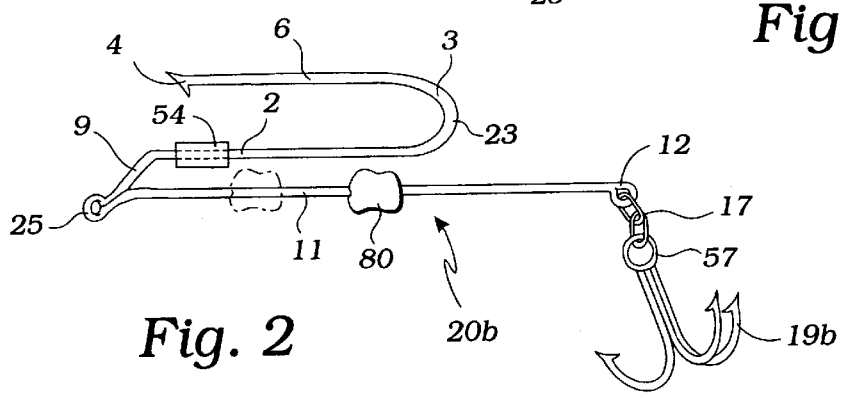
Fig. 2
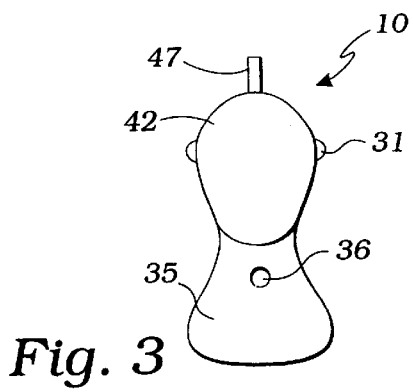
Fig. 3

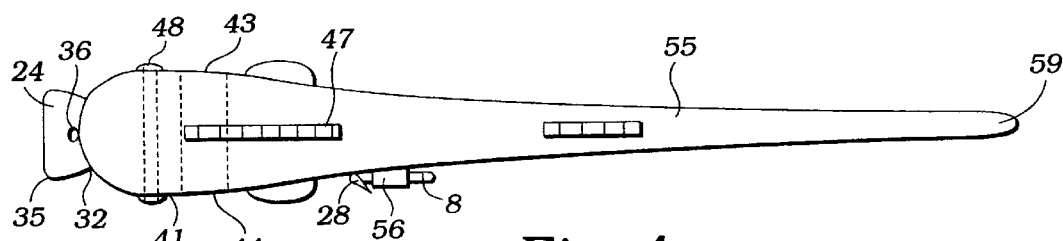
Fig. 4
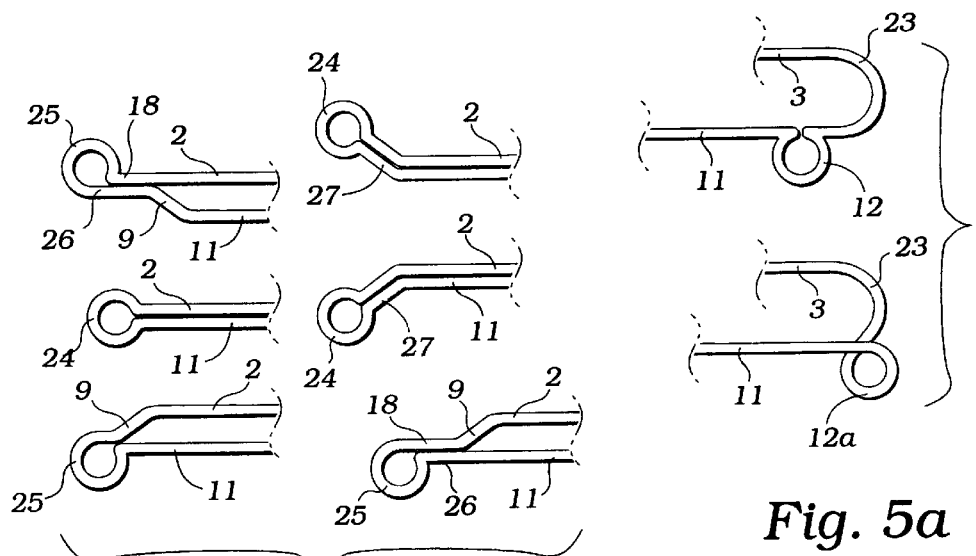
Fig. 5
Fig. 5a
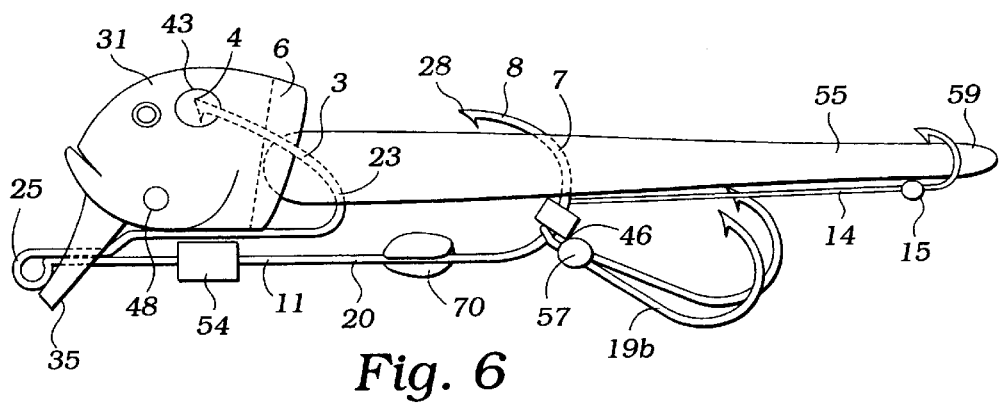
Fig. 6

FLEXIBLE OSCILLATING FISHING LURE SYSTEM

FIELD AND BACKGROUND OF THE INVENTION

1. Field of the Invention

This invention relates generally to fishing lures with emphasis on special hooks, soft plastic baits with flexible elliptical or isosceles trapezoid shaped diving lips, and related accessories, and more particularly to tandem two-hook fish hooks, capable of being modified into many shapes and sizes, variations of said hooks supporting one and two piece soft artificial fish, worms, insects, or other creature-like bodies, having an attached forwardly and downwardly projecting flexible lip.

2. Background of the Invention

The purpose of fish hooks is to hold and present live and artificial baits, including water or air borne fish forage in an enticing action to catch different kinds of fish. The following art defines the present state of this field:

Leinonen, U.S. Pat. No. 2,825,174 teaches that a fish hook with a rearwardly directed barbed bait holding pin does hold and align bait, and is inferior in it's ability to hold bait relative to a forwardly directed hook. His hook conformation has line attachment eye below center of gravity making it difficult in many cases to stop bait spin and unwanted line twist. Small hook at top rear requires separate expensive fabrication procedures, and downwardly positioned hook is more likely to snag on obstructions and is often not as efficient in catching fish as an upwardly positioned hook.

Jacobus U.S. Pat. No. 4,251,942 discloses a fish hook having the traditional barbed hook at rearwardly end of hook shaft, an upwardly directed bait holding post, an upwardly directed line eye, with all members in same vertical plane, however, bait impaled on short vertical post is easily dislodged when fish strike or after repeated casts, causing loss of bait, line twist, and loss of fishing time to readjust and replace bait.

Roy U.S. Pat. No. 2,563,554 discloses that most available standard hooks do not hold or keep bait aligned as well as they might. Mr. Roys' hook consists of two barbed ends, one end shaped as a fish hook and the other as a straight barbed pin, and a line eye, said barbed pin angled from hook shaft and being very short, makes attaching and retaining live and artificial bait, so that it continuously appears life like is most difficult, especially after numerous cast or a strike.

Rudolph U.S. Pat. No. 5,119,581 describes a lure having a creature-like head with a forwardly and downwardly directed rigid blade permanently attached to a specially bent hook, said blade does not flex nor bend rearwardly to release hang-ups, is expensive to produce, and is not readily interchangeable, said lure is not provide with tandem two hook fish hook separate rear hook shaft for selectively positioning of removable adjustable hook weights, and has no secure provisions to hold and keep baits aligned and no separate front hook on which to attach live or artificial fish, worms and jigs of the invention.

Clearly there is a need for such lures with life like fish attracting action, a hook, which will align and hold baits, jigs, and fly type lures securely and still be relatively simple and inexpensive to manufacture. The above listed objects are all parts of the invention and with their various options and modifications fulfill these apparent needs and provide further related advantages.

SUMMARY OF THE INVENTION

The present invention provides a fishing lure system, having a novel side to side oscillation, and has a highly snag resistant flexible diving lip. A bait is impaled on a novel tandem two-hook fish hook. The lure may be controlled as to how it descends, front end first, rear end first, or level, by special adjustable hook weights, which are secured at a selected place on the hook shaft. A permanent weight is formed forwardly and above a rear hook shaft eye and prevents the eye from opening. The weights prevent lure spin and insure proper oscillation. A soft open cell, scent dispensing foam jig is impaled on the front hook rearwardly of a fish or creature-like head, having colorful feathers, hair, or plastic streamers for cascading over and around the rear hook. A novel coating retards destructive paint defacing problems so that a range of colors may be mixed to better replicate a live bait.

The present invention teaches certain benefits in construction and use which give rise to the objectives described below.

A primary objective of the present invention is to provide a fishing lure having advantages not taught by the prior art.

A further objective is to provide such a lure having a flexible snag resistant diving lip.

Another objective is to provide such a flexible fishing lure having a novel side-to-side motion when moving through the water.

A further objective is to provide such a flexible fishing lure having a novel tandem two-hook fishing hook with an armature suspending optional hooks and essential modifications.

A still further objective is to provide such a flexible fishing lure having certain features of construction which enable the lure to move, descend and ascend in a predictable manner.

A further objective is to provide such a fishing hook having a permanent weight molded the rear of the hook shaft to add weight and prevent the eye from opening.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIG. 1 is a perspective view of a one piece lure consisting of a tandem two-hook fish hook, having both hooks coplanar vertically and aligned, a soft flexible fish-like bait with flexible diving lip, buoyant plug, torpedo shaped rattle, and fins with scent plug impaled on a rear hook shaft, and further showing a rear hook shaft eye under a rear hook shaft terminal end and alternate position of rear hook, shown in dashed lines, bait belly and diving lip optionally filled with high density solid material;

FIG. 1a is an elevational side view of a tandem two-hook fish hook as shown in FIG. 1, having a rear hook shaft acutely angled from the front hook shaft, curved upwardly, and hook curse horizontally;

FIG. 2 is an elevational side view of a modification of FIG. 1a, having rear hook eliminated and replaced with hook shaft eye under rear hook shaft, "O" ring suspending treble hook, scent dispensing plug on front hook shaft, adjustable hook weight on rear of hook shaft and optional hook weight position;

FIG. 3 is a front elevational view of the lure of FIG. 1, showing diving lip angle, elliptical shape and optional isosceles trapezoid shaped flexible diving lip, line eye hole indicator in diving lip, bait eyes protruding from head;

FIG. 4 is a top plan view of a lure showing fish-like body shape, flexible elliptical or isosceles trapezoid shaped diving lip, optional torpedo shaped rattle and buoyant plug locations, fins, optional hook slot indicator and a thin rear body portion;

FIG. 5 shows six optional positions of a fish hook line eye;

FIG. 5a shows two rear hook shaft eyes, hook shaft bent and crimped over removable pin and winding rear hook wire around said pin;

FIG. 6 is an elevational side view of a buoyant fish-like head with flexible diving lip, optional buoyant plug and optional torpedo shaped rattle, a worm-like trailing bait, having vertical hook slot indication in bait body, basic tandem two-hook fish hook, formed from a single piece of rigid wire, double hook suspended on rear hook curve and secured by soft open cell scent dispensing grommet impaled on rear hook, monofilament line with attached stinger hook, and a compressed or set screw/groove type adjustable hook weight in rear most position;

DETAILED DESCRIPTION OF THE PREFERRED EMBODIMENTS

Figure 7:
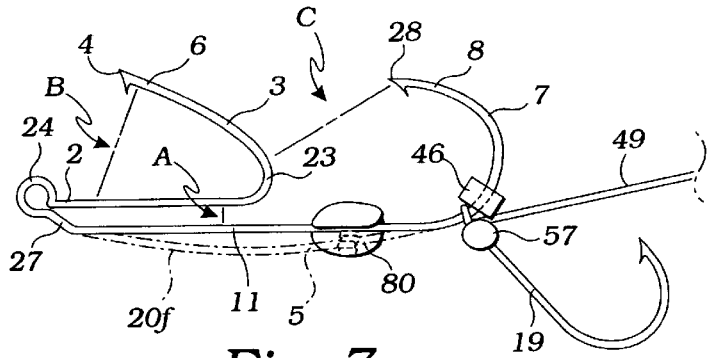
FIG. 7 is an elevational side view of a modified tandem two-hook fish hook formed from a single piece of rigid wire, line eye above separated hook shafts, elongated front hook barb slightly curved, rear hook positioned up, single weedless hook suspended on rear hook curve, secured by retaining grommet, and a groove type adjustable hook weight, and spaces and lengths of various hook parts designated by letters "A", "", and "C"

The above described drawing FIGS. 1–15b illustrate the invention, a tandem—fish hook apparatus for better aligning and securing various live and artificial baits and therefore providing a superior method of enticing fish.

A fishing lure 10 (shown in FIG. 1) is comprised of a tandem two hook fish hooks—front hook 3 and rear hook 7 formed from a single piece of rigid tempered wire "W", as shown in FIG. 1a and forming a tandem two-hook apparatus 20. Each front hook 3 and rear hook 7 has a corresponding front hook shaft 2 and rear hook shaft 11. Front hook 3 bends rearwardly to curve 23, then inclines forwardly and upwardly with slightly curved front hook barb 6, to point 4, as shown in FIG. 1a. A rear hook shaft 11 is acutely angled from front hook shaft 2. Rear hook 7 curves upwardly so that it enters and exits through the sides of bait 55, as shown in FIG. 6.

Rear hook shaft 11 continues from line eye 25, rearwardly to form optional upwardly turned hook 7. Hook 20 is attached to fishing line "L" with snap 16, as shown in FIG. 1.

In a second embodiment, as shown in FIG. 2, the invention is similar to the first embodiment described above, but rear hook 7 is eliminated and replaced with hook shaft eye 12, as well as "O" rings 17, 57, and dual trailer hook 19b. Additionally, in this second embodiment scent plug 54 is impaled on hook shaft 2 and adjustable hook weight 80 is secured on rear hook shaft 11.

Lure 10, shown in FIG. 3, is a one-piece optionally buoyant soft flexible artificial fish or other creature-like form, consisting of a forwardly and downwardly-projecting flexible, preferably clear, diving lip 35. The diving lip 35 is shaped in a vertical elliptical or isosceles-trapezoidform. Where the bait 55 and the diving lip 35 are artificial, the bait 55 and the diving lip 35 are hand poured or injection molded with the same material. Inventively, the diving lip 35 of the lure 10 causes the lure 10 to dive and to oscillate in a side to side, swimming, fish-enticing manner as water alternately surges irregularly past the edge and sides of the diving lip 35.

Figure 11:
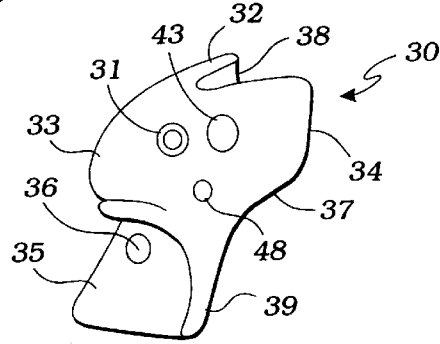
FIG. 11 is a perspective view of a buoyant fish-like head, consisting of flexible isosceles rapezoid shaped diving lip, trailing bait recess, hook line eye hole indicator on lip vertical center line, optional buoyant plug and torpedo shaped rattle.
Figure 12:
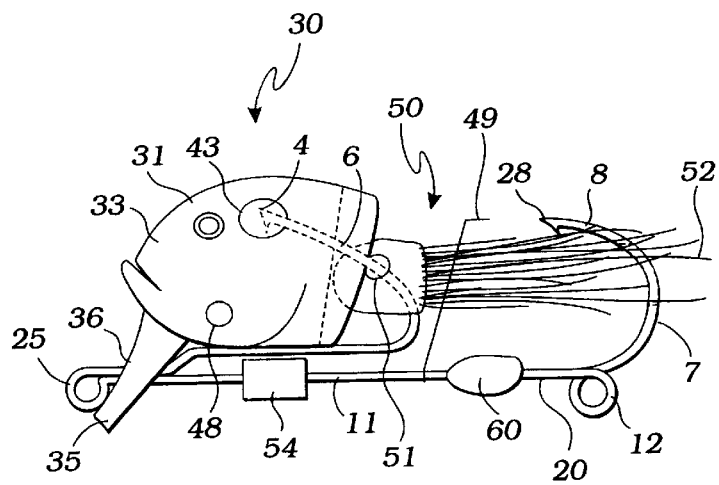
FIG. 12 is an elevational side view of the hook of FIG. 1 having a buoyant fish-like head with flexible diving lip, trailing replaceable jig of the invention, impaled on front hook, trailing jig members cascading over and around rear hook, compression type adjustable hook weight, buoyant plug, rattle, optional hook guard and scent plug.

In a third embodiment, the invention is similar to the first embodiment described above, however, the lure 10, has a fish-like head 30. impaled on a jig 50 or on hook trails 52, as shown in FIGS. 6, 11, 12. Live or artificial bait 55 is attached to either the fish head 30 or the jig 50. The rear hook 7, having the dual trailer hook 19b, and an open cell foam grommet 46, used for scent-displacement, is inserted over hook shaft 11. Stinger hook 15 is attached with line 14. Alternately, three adjustable hook weights 60, 70, and 80, shown in FIGS. 12, 13, 14, and 15, are selectively attached to and below rear hook shaft 11; or, alternately, hook shaft 5. The adjustable hook weights 60, 70, and 80 controls how lure 10 descends.

Figure 13:
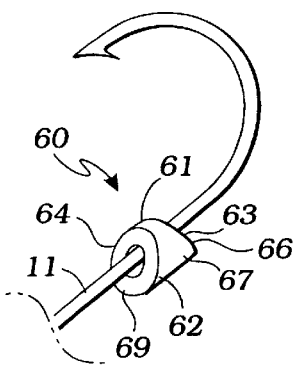
FIG. 13 is a perspective view of a compression type adjustable hook weight, consisting of a short body with vertical elongated longitudinal through hole in upper portion.
Figure 13A:
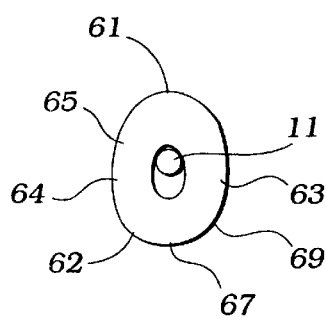
FIG. 13a is an end view of FIG. 13 showing end elliptical shape, location of vertical elongated longitudinal through hole and hook shaft.
Figure 13B:
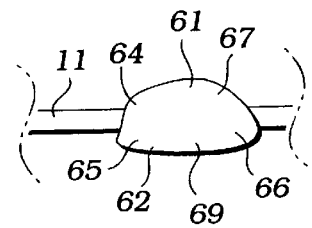
FIG. 13b is a side view of FIG. 13 showing weight general profile with clinch marks.
Figure 14:
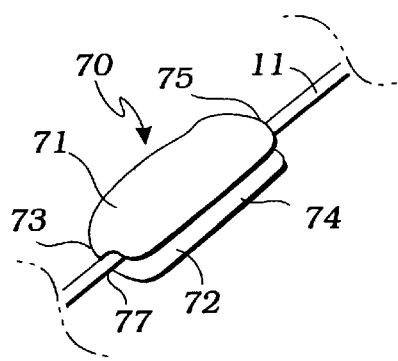
FIG. 14 is a perspective view of an adjustable hook weight affixed to a hook shaft by compressing a longitudinal groove or by a slot head, non-corrosive, set screw, having an opposing conical end, turned in angled threaded hole in weight bottom surface, said bolt is turned to force conical end against outside edge of hook shaft, forcing hook shaft against top and rear of hook shaft groove.

Closed line eyes 1, 24, and 25, as shown in FIG. 5, cause lure 10 to activate properly when adjustable hook weights 60, 70, and 80 are added. When dual trailer hook 19b is attached to rear hook 7, lure 10 will oscillate correctly when hook shaft eye 12 is placed, during manufacture, in any position along rear hook shaft 11, as shown in FIG. 5a. When adjustable hook weights 60, 70, 80, as shown in FIGS. 12, 13, and 14, and permanent weight 90 are properly affixed to tandem hook rear hook shaft 11, unwanted lure spin and resulting line "L" twist is eliminated.

Different live baits, artificial lures, and fishing techniques may require putting the hook shaft eye 12 in many alternate positions along rear hook shaft 11. Special hooks with different line eyes 1, 24, and 25 shown in FIGS. 1, 1a, 2, 5, and 6, are essential to achieve proper bait action and bait presentation.

Again, in the third embodiment, with the lure 10 shown in FIGS. 6, 11, 12, having the fish-like head 30, the slightly curved barbed portion 6 of the front hook shaft 2 is elongated to provide a means to properly align and secure a buoyant plug 43 in the fish head 30, as shown in FIG. 11, with a flexible blade 35, and optional trailing baits 55, as shown in FIGS. 6,.

FIG. 5 illustrates different configurations of straight rear hook shaft 11 and front hook shaft 2 when line eyes 1, 24 or 25 are employed. FIGS. 5(a)(f) illustrates the situation where straight rear hook shaft 11 and front hook shaft 2 extend rearwardly on short parallel legs 18 and 26. Then, in FIG. 5(a), short parallel leg 26 is angled to form short leg 9, which joins with rear hook shaft 11. In FIG. 5(f), short parallel leg 18 is angled to form short leg 9, which joins with front hook shaft 2. In FIG. 5(c), from line eye 25, the straight rear hook shaft 11 and front hook shaft 2 form no intermediate portions 18 and 26, but short leg 9 of front hook shaft 2 is angled from line eye 25 before joining with front hook shaft 2, and rear hook shaft 11 extends straight directly out from line eye 25. In FIG. 5(d), parallel short legs 27 are angled out from line eye 24 before forming straight rear hook shaft 11 and front hook shaft 2.

In a fourth embodiment, as shown in FIG. 7, the invention is similar to the first embodiment described above, but hook 20h is shown having a weed guard attachment 49. With rear hook 7 positioned upwardly, point 28 is preferably in vertical alignment with front hook point 4 and line eye 24. The size of rear hook 7 is determined by the curvature of the inverted arc of the curved rear hook shaft 5.

In a fifth embodiment, the invention is similar to the first embodiment described above, but, as shown in FIG. 7, and indicated by dashed lines 20f, where inverted alternate curved rear hook shaft 5 has been eliminated and replaced with rearwardly directed straight rear hook shaft 11. Letter "A" shown in FIG. 7, is the vertical distance between front hook shaft 2 and curved rear shaft 5 or straight shaft 11, this distance may range between 0% and 40% of the height of hook, minimum space is required to attach adjustable hook weights 60, 70, and 80. Letter "B" shown in FIG. 7, denotes length of barb 6 between front hook point 4 and outside of hook curve 3 and varies in length as to kind and size of fish or creature-like head and proposed baits to be used. Letter "C" also shown in FIG. 7, is the space between curve of front hook 3 and point 28 of rear hook 7. This space can also vary, but the distance should not be less than 20% of the hook 20 length to optimize the accessibility of rear hook point 28 for hooking fish.

In a sixth embodiment, the invention is similar to the first embodiment described above, but hook 19b is a single hook 19, as shown in FIG. 7. A scent-dispensing grommet 46 retains hook 19. Weed guard 49 is inserted over rear hook curve 8. The scent dispensing grommet 46 retains hook 19 in position, as well as the weed guard 49, taken with use of the modified hook 20f, increases the potential to catch fish.. In this embodiment, the rear hook 7 must be positioned upwardly.

Figure 8:
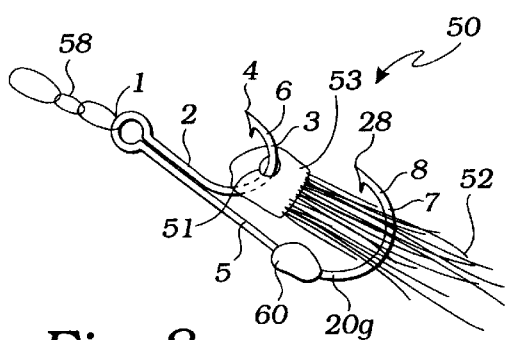
FIG. 8 is an elevational side view of.a tandem two-hook fish hook showing a line eye in line with a front hook shaft, both hook shafts curved, replaceable jig of the invention having front member a scent dispensing foam form impaled on front hook with jig trailing members cascading around upwardly positioned rear hook, compression type adjustable hook weight.

In a seventh embodiment, shown in FIG. 8, the invention is similar to the first embodiment described above, with front hook 3 (20g) designed to accept a quick and easily applied interchangeable accessory jig 50, comprised of feathers, hair, trailing members 52, or other jig type materials encapsulated in a soft tough open cell scent dispensing foam plastic form 51. Said foam form 51 is impaled on front hook 3 curve 23 of hook 20g of the invention, allowing trailing members 52 to cascade over and around rear hook shaft 5 and hook 7, as shown in FIG. 8, and optional weed guard 49, as shown in FIG. 12. Foam plastic form 51, can be of many sizes, shapes, colors with optional luminous painted or artificial eyes, Jig 50 includes different colors of feathers, hair, or trailing members 52, and is readily interchangeable to better target different kinds of fish, or to better compensate for environmental conditions such as water clarity and light. The ability of jig 50 to include different colors of feathers, hair, or trailing members eliminates need to change hooks, making jig 50 versatile and affordable. Jig 50 also works in an excellent manner when impaled on single conventional hooks. When an adjustable hook weight 60 is placed at the rear of hook 20g, jig 50 billows out when the line is allowed to go slack. As shown in FIG. 12, when jig 50 is substituted for live or artificial bait 55, and placed rearwardly of fish head 30—with either a diving lip 35 or a diving lip 45—jig 50, inventively, produces its own life-like, side to side, fish enticing, swishing action. Any of the adjustable hook weights 60, 70, 80, and permanent weight 90 of the invention aid in eliminating lure spin. As lure 10 is pulled through water, water pushes against diving lip 35, along front of lure body 42, forces lures 10, rearwardly on front hook curve 23 , causing lure 10 to slide rearwardly and downwardly, binding lures 10 between front hook barb 6 and front hook shaft 2, maintaining alignment and increasing holding strength on all baits 55 and fish head 30.

In an eighth embodiment, designed to eliminate the issue of weeds becoming stuck on the hook, the invention is similar to the first embodiment described above, but a side of bait 55 is penetrated so that rear hook barb 8 is just beneath either side surface, rear hook point 28 should break the surface, shown in FIG. 6. This method of rigging is called, "Skinning". To work effectively, the hook shafts must be perpendicular to the diving lip 35 bottom edge to insure proper movement, as shown in FIG. 6.

Figure 9:
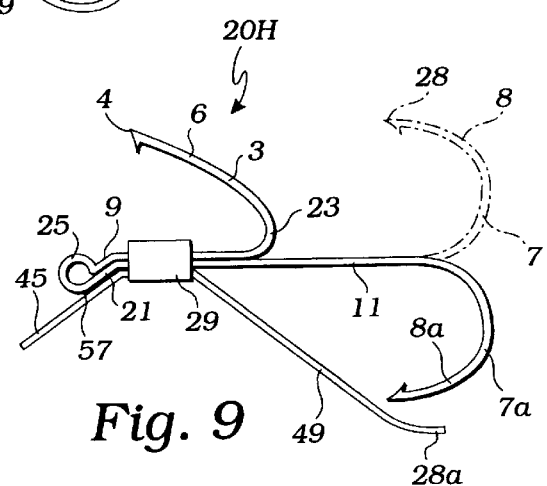
FIG. 9 is an elevational side view of a tandem two-hook fish hook with a line eye below a straight hook shaft, and with a rear hook positioned downwardly showing an optional alternate position upwardly oriented, and having a flexible diving lip.
Figure 10:
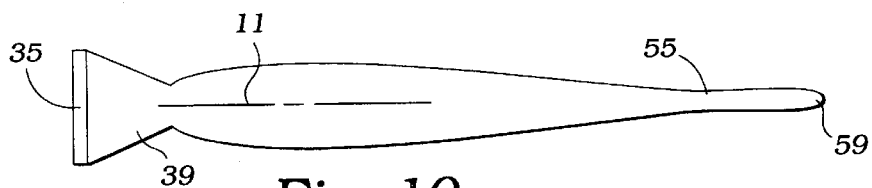
FIG. 10 is a bottom view of one-piece soft artificial bait, showing a bottom edge of the diving lip perpendicular to the front hook shaft longitudinal axis.

In a ninth embodiment, the invention is similar to the first embodiment described above, and, as shown in FIG. 9, hook 20h (a modification of hook 20), is also formed from a single piece of rigid wire "W", having forwardly and upwardly extended front hook 3, barb 6 intersecting at curve 23 with hook shaft 2, and closed line eye 25 below hook shafts 2 and 11, and secured on the front surface of the permanently attached diving lip 45 by bond or weld 57 on the vertical center line of the generally elliptical or isosceles-trapezoid-shaped diving lip 45. Diving lip 45 may be flexible or rigid. Alternatively, fish line eyes 1 and 24 can also be utilized, as their shape is necessary with some baits. Wwhen fish line eyes 1 and 24 are utilized, diving lip 45 is also aligned and secured by a rearwardly directed "U" shaped projection 29, which is attached by a, bond or welded 57, or by cinching, to both hook shafts 2 and 11 and short legs 9 and 21. Rear hook shaft 11 is straight and extends rearwardly, terminating with a downwardly directed rear hook 7a or optionally directed up, small gauge plastic or wire weed-less appendage 49 is optionally attached inside "U" shaped rear projection 29 and extends below and past rear hook point 28a on hook 7a. Theflexible diving lip 45 of hook 20h, as shown in FIG. 9, must have integrity and memory to quickly return to its original position. The rigid diving lip 45 is made of metal and welded to hook shaft 2 and rear hook shaft 11 Lip 45 does not flex and is generally used in impediment-free water.

FIG. 11 shows the fish head 30 with the forwardly and downwardly directed elliptical or isosceles trapezoid shaped flexible diving lip 35, having a top 32, a bottom edge 39, a forward end 33, a trailing end 34, a rear bait aligning depression 38, a bottom hook aligning slot 37, and a hole 36 in line with slot 37 in upper portion on vertical center line of diving lip 35. The fish head 30, its weight being lighter than water, causes the lure 10 to stay on surface, to run true, to maintain proper side to side oscillation, and to eliminate lure spin. The fish head 30 is composed of thermoplastic elastomer materials applicable to pouring in open mold or injection molding, including closed cell polyurethane or other thermoplastic elastomeric foams or micro-balloon filled viscous materials. The Flexible diving lip 35 is compounded from the same tough body materials with high tear strength properties. The fish head 30 also has excellent elasticity in order to return to its original shape as quickly as possible. The diving lip 35 must be rigid enough to not bend rearwardly when lure 10 is pulled rapidly through water, yet must be flexible enough to bend easily so that a line "L" does not have to be pulled to excess in order to free lure from obstacles, such as weeds, rocks, and brush. Conventional lures now in the marketplace have rigid frontal diving lips, making them almost impossible to pull free of obstacles. The harder the line is pulled, the tighter the obstacle is wedged. To avoid this problem with diving lipped lures, the "L" line must be affixed at a special place on the diving lip, which forms a "V" shape between line "L" and rigid diving lip, causing weeds, brush, and rocks to become wedged therein. Flexible diving lip 35 of this invention eliminates this common problem, as it is not rigid and bends rearwardly with only a moderate line pull, allowing the lure 10 to pass over top of impediments.

To assemble a two piece lure 40, shown in FIG. 7, a short forward portion of live or artificial bait 5, not less than one-eighth inch, depending on the size of hook 20 and the size and shape of live or artificial bait 55 is impaled on front hook point 4 and barb portion 6, then pushed rearwardly over curve 23 of hook 3. A second short rear portion of bait 55 is gathered forwardly, then pushing excess rearwardly on to hook point 28, impaling the bait 55 on rear hook 7, with point 28 near or outside the bait 55 top surface or side surface, so that hook point 28 can easily break loose to catch fish. Care needs to be taken that hook shaft 11 is in straight alignment with pull of fish line "L". The fish head 30 is then attached to hook 20 by inserting point 4 and barb 6 of front hook 3 into the vertical center line of rear depression 38, as in FIG. 11, until front hook shaft 2 is firmly contacting bottom groove 37 of head 30. The barb 6 continues to be pushed into the head 30 until line eyes 1, 24, or 25 protrude just through the provided indication, or hole 36 on vertical center line of diving lip 35. The further line eyes 1, 24, and 25 extend past lip 35, the less lure 10 oscillates. The front end of bait 55 fits into head 30 rear depression 38. With large lures 10, attach snap 16 is attachd to line eye 1, 24, or 25. On small lures, snap 16 is usually eliminated and lure is tied directly to line "L" with a friction-eliminating open loop knot to reduce weight and friction. In some instances, my patented double loop accessory 58 can be substituted. Double loop accessory 58 is attached to line eye 1 shown in FIG. 9, on hook 20g. Head 30 is quickly and easily interchangeable so that different size heads 30 and different colors and embellishments can be used with different baits 55 and jigs 50 for different water and light conditions, without removing trailing baits or changing hooks. To loosen lure 10, a fish must destroy diving lip 35 on fish head 30, once line "L" snap 16 is attached to hook eye 24.

Figure 15:
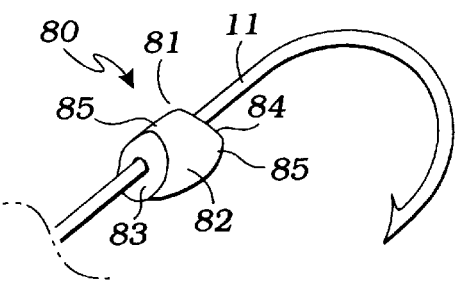
FIG. 15 is a perspective view of still another adjustable amorphous ellipsoid shaped hook weight, having a longitudinal vertical elongated shaped through hole large enough to accept hook barb and curve of rear hook, said weight being secured by non-corrosive set screw through bottom surface or by clinching weight to rear hook shaft with pliers or other suitable tool, generally used on large hooks.
Figure 14A:
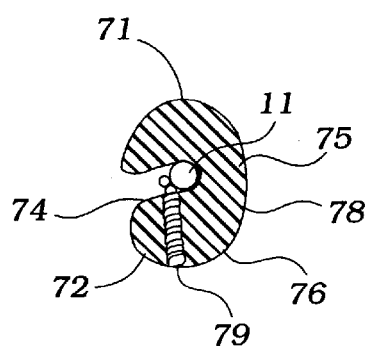
FIG. 14a is a sectional end view of the adjustable hook weight, showing inclined hook shaft groove, conical set screw end against side of hook shaft in inclined threaded hole.
Figure 15A:
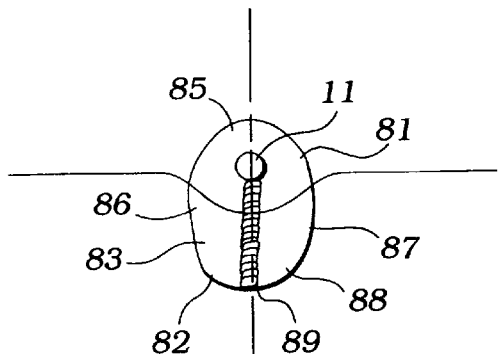
FIG. 15a is rear view of FIG. 15, showing elongated shaped hole in upper portion of elliptical end shape of weight, and hook shaft securing non-corrosive set screw.
Figure 14B:
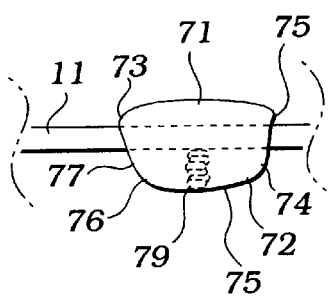
FIG. 14b is a right side view of FIG. 14 showing adjustable hook weight shape, hook shaft groove set screw and hook shaft.
Figure 15B:
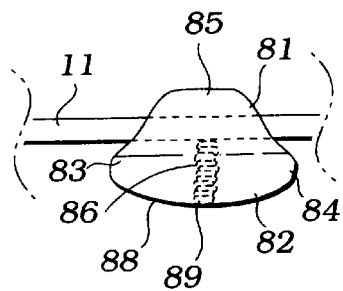
FIG. 15b is right side view of FIG. 15 showing weight side contour, hook shaft in elongated shaped hole in upper projection, and location of vertical securing non-corrosive set screw.

Inventively, the adjustable fish hook weights 60, 70, and 80 not only causes lure 10 to descend more quickly, but determines how different live or artificial baits 55 or jigs 50 act when sinking. Adjustable hook weights shown in FIGS. 12, 13, and 15 are affixed forwardly and below rear hook shaft 5 or 11, causing lures 10, to sink front end first, the unnatural way lures now used. with line sinkers descend, a technique generally used with worms, leeches, or minnows. When placed at rear of hook shaft 5 or 11, all lures sink rear end first, allowing feather, hair, or plastic streamer type jigs 50 to billow out when descending. When placed at lure balance point on hook shaft 5 or 11, lures descend level or splayed out, a natural presentation for frog, lizard, and minnow type baits 55. Minor adjustments forwardly on hook shafts 5, or 11, allow lures to glide forwardly and downwardly. A slight twitch of the fishing rod raises the front of the lure, and a limp line allows gliding action to be repeated. This gliding action entices fish over a large area and is excellent when still fishing or ice fishing. Adjustable hook weights shown in FIGS. 12, 13, and 15, vary in shape and sizes Alternately, theadjustable hook weights 60 shown in FIG. 13, exhibits a longitudinal vertically elongated shaped hole 67 in a short body 69. The elongated hole 67 is large enough to allow hook barb 8 and curve 7 or line eye to slip through, so that weight can be placed properly on hook shaft 11 before tightly compressing with pliers or another suitable tool. Weight properties of adjustable hook weights 60 are dense and malleable. A second alternate adjustable hook weight 70, as shown in FIG. 14, is of different shapes and generally harder material, such as brass, rather than lead in weight 60. The adjustable hook weight 70 consists of a longitudinal hook shaft groove 75, extending the length of adjustable hook weight 70, a weight side surface 73, an upwardly-angled groove 75 penetrating to the center of weight longitudinal axis 77, and allowing hook shaft 5 or 11 to lodge along center of weight longitudinal axis 77 77. Threaded hole 76 is provided in bottom surface 72 of center of weight 70 so that threaded bolt 78, with slot head 79 on one end, and a conical shape 71 on opposing end, can be turned into threaded angled hole 76 through bottom surface 72 of weight 70.

The Adjustable hook weight 70 is attached to hook shaft 11 by placing length of hook shaft 11 against the top of longitudinal groove 75. With weight 70 positioned at a selected place on hook shaft 11, slot head bolt 78 is turned with a screw driver or like tool to exert pressure, with conical shaped threaded bolt end 71 contacting the side of hook shaft 5 or 11, wedging shaft 5 or 11 against the rear and top of longitudinal groove 75. Weight 70 compressed on hook shaft 11 is generally non-removable. A third adjustable hook weight 80, shown in FIG. 15, is comprised of a generally amorphous ellipsoid shaped lower body portion, having a vertical threaded hole 86 in the center of the bottom surface 82 to contain a slot-head or Allen-head bolt 88, commonly called a set screw. The opposing end of bolt surface flat, a longitudinal upper portion 87 above the center of hook weight lower body, contains a longitudinal vertically elongated shaped hole 86 at the intersection of upper portion 87 of weight 80 body. The elongated shaped hole 86 is large enough to allow hook point 28, curve 8 or line eye 1 to pass. Vertical hole 86 is positioned on longitudinal center line of upper portion 87, so that rear hook shaft 11 is confmed by flat end of securing set screw 89. Said adjustable hook weight 80 is attached to rear hook shaft 11 by inserting hook point 28 and barb 8 in hole 86 in weight upper portion 87, holding hook perpendicular to weight 80, and continuing to push hook 7 though hole 86 until hook 7 curve 8 has passed through and weight 80 and is on hook shaft 11, rotating the hook so that both hook 7 curve 8 and hook weight 80 are in vertical alignment, moving weight 80 along hook shaft to selected position, and tightening set screw 88 with screw driver or appropriate tool in a clockwise direction until weight 80 is secure on hook shaft 11.

Alternately, weights 70 and 80 may be secured to hook shaft 5 or 11 by crimping weight with pliers or suitable tool over hole 81, onto hook shaft 11. This method makes weight difficult to re-position along hook shaft and is generally non-removable. Adjustable hook weights 60, 70, and 80 being either spherical or ellipsoid in conformation are adaptable to certain size hooks. Said weights are not generally applicable for fishing line. Adjustable hook weights shown in FIGS. 13, 14, and 15, are fabricated from lead, if permitted, brass, bronze, stainless steel, and other high density non-corrosive and non-toxic low specific gravity materials, such as barium sulfate and zirconium silicate compounded in epoxy or other suitable compounding material. Said high density solids are optionally added to bait belly 91 and lip 35 to lower center of gravity, to sink lure and to eliminate lure spin and line twist. Since alternate materials are generally lighter than lead, more than one weight 60, 70, or 80 may be required to sink lures to obtain desired results. Lead weights, if permissible, are generally untreated or color coated, whereas compounded weights of this invention are filled with non-toxic and non-corrosive pigments; they cannot peal. A one-eighth oz. adjustable weight 60, 70, or 80 on rear hook shaft 5 or 11 has no deleterious effect on lure 10action if the lure is four inches or longer; in fact they enhance the side to side, swimming, oscillating, fish enticing action. Permanently attached rear weight 90 prevents rear hook shaft eye 12 from opening, helps to maintain proper lure oscillation and eliminates lure spin and unwanted line twist. Torpedo rattles 48 are inserted below bait eyes 44 or in lower thick body parts. Different diameter and lengths of open cell foam scent dispensing plugs 54 are impaled on hook shafts 2 and 11, to stimulate the auditory and olfactory senses to attract fish. Said scent plugs 54 are impregnated with different fish enticing scents and dried. When plug is immersed in water, the scent medium dissolves, releasing scent. Scent plug 54 is supplied in different diameter open cell foam rods to be cut by fisherman in the field. Lure 10, using various accessories, can be used with surface, suspended, and deep fishing. A special coating, which retards or stops the plasticizer in soft plastic baits from removing boat finishes, lure paint, and from destroying fishing tackle boxes, is an integral part of the invention. The coating may be colored to replicate live fish, animals, insects and other fish forage. The coating medium is a dispersion of Polyvinyl chloride and plasitsols of the bait material, dissolved with tetrohydrofuran. The same physical elongation properties and Shore A hardness of the baits is necessary to insure a perfect bond when bait is stretched. Said coating consists of a primer/color coat/clear sealer, the second or color coat is a mixture of clear medium and selected pigments, and the third finish coat, is clear paint coat medium, said coating can be applied by dipping, brushing, and spraying. All surfaces must be totally wet when applied. Bait 55 eyes 31 coated with red luminescent paint when applicable.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A fishing lure comprising a tandem two-hook fish hook having a forward hook and a rearward hook, wherein both hooks are vertically aligned and coplanar, the forward hook being embedded within a flexible bait and providing a line attachment eye, the line attachment eye extending through a diving lipof the flexible bait and terminating forward thereof, the diving lip having such rigidity as to provide negligible deflection of the diving lip under the pressure of water flowing past the lure, and sufficient deflection of the diving lip when the diving lip encounters an immovable underwater object, so as to prevent the lure from being snagged thereon.

2. The lure of claim 1 further providing a buoyant plug, impaled on the forward hook, for enabling a selected buoyancy of the lure.

3. The lure of claim 1 further providing an elongate rattle integral with the bait for providing a sonic attraction to nearby fish.

4. The lure of claim 1 wherein one of the hooks includes a weight enabled for adjusting the pitch of the bait when submerged.

5. The lure of claim 1 wherein the rearward hook is formed and terminated with an upwardly directed barb.

6. The lure of claim 1 wherein the rearward hook further comprises a closed eyelet.

7. The fishing lure of claim 1 wherein the bait has a fish-like body shape, an elongate rattle buoyant plug, and a flexible body portion.

8. The fishing lure of claim 1 wherein the hooks are formed from a single piece of rigid wire and further comprising a separate worm-like trailing bait positioned rearwardly of a creature like head and a trailing hook engaged with the rear hook.

9. The fishing lure of claim 1 wherein the rear hook is formed into a hook shaft eye positioned under the rear hook shaft, and further providing an o-ring suspending treble hook, a scent dispensing plug positioned on the front hook shaft, and an adjustable hook weight positioned on the rear hook shaft.

10. The fishing lure of claim 1 wherein the diving lip has an elliptical shape.

11. The fishing lure of claim 1 wherein the diving lip has the shape of a modified isosceles trapezoid.

12. The fishing lure of claim 1 wherein the bait has a fish-like body shape, elongate rattle, a buoyant plug, and a flexible rear body portion.

13. The fishing lure of claim 1 further comprising a line eye integral with and positioned below the hooks, the rear hook pointing downwardly, the flexible diving lip being permanently engaged with the hooks on the center line of the lure.

14. The fishing lure of claim 1 further comprising a line eye integral with and positioned below the hooks, the rear hook pointing upwardly, the flexible diving lip being permanently engaged with the hooks on the center line of the lure.

* * * * *